June. 7, 1938.   J. D. FERRY   2,119,909
MATERIAL TREATING AND HANDLING APPARATUS
Filed July 16, 1932
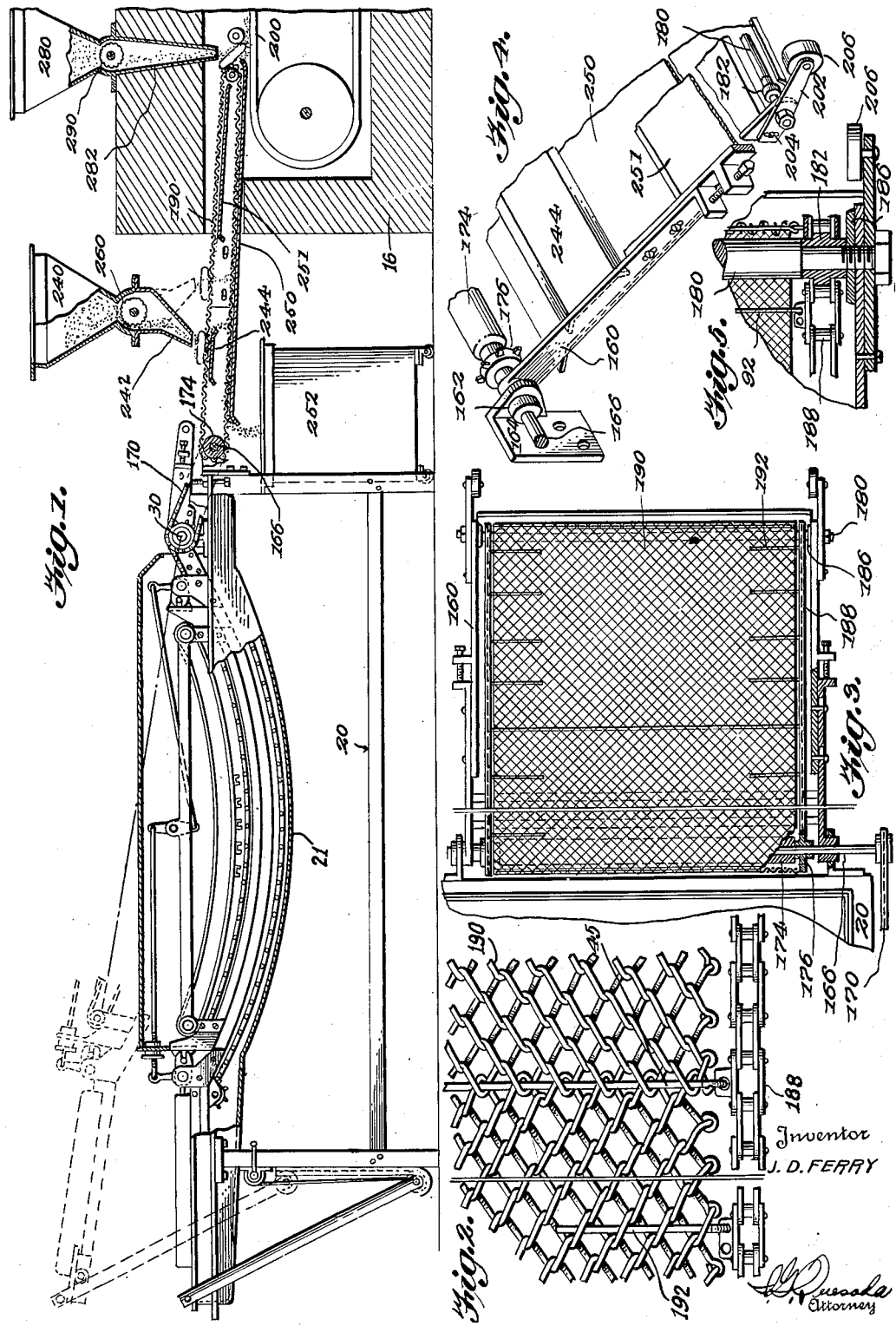

Patented June 7, 1938

2,119,909

UNITED STATES PATENT OFFICE 2,119,909

MATERIAL TREATING AND HANDLING APPARATUS

Joseph D. Ferry, Harrisburg, Pa.

Application July 16, 1932, Serial No. 622,976

14 Claims. (Cl. 107—43)

This invention relates to material treating and handling apparatus especially adapted for use in the preparation of such food stuffs as pretzels although, as the description proceeds it will become apparent that the invention is capable of other uses.

Briefly stated, one of the important aims of the invention is to provide a simple means by which pretzel forms or the like may be furnished on the upper and lower surfaces thereof with a coating of salt first, to improve the salability of the pretzels and second, to cause the salt furnished to the lower surfaces of the pretzels to space the pretzels slightly above the movable hearth of the baking oven through which the pretzels are conducted and by thus spacing the pretzels above the hearth, scorching of the pretzels is avoided.

In the accompanying drawing, forming a part of this application and in which like numerals are employed to designate like parts throughout the same, Figure 1 is a vertical longitudinal sectional view through the apparatus applied, Figure 2 is a fragmentary plan view of a conveyor embodied in the invention, Figure 3 is a plan view of a conveyor embodied in the invention, a portion of the mounting for the conveyor also being shown and parts being in section, Figure 4 is a fragmentary perspective illustrating a portion of a conveyor, the woven wire belt being omitted from this view, Figure 5 is a detail horizontal sectional view through the outlet end portion of the conveyor.

In the drawing, wherein for the purpose of illustration is shown a preferred embodiment of the invention, the numeral 20 designates the frame of a pretzel cooking mechanism, the frame may be formed of angle iron or other suitable material and has a top which carries a tank 21 through which the pretzels are conducted. The prior art, as represented, for example, by my prior Patent #1,760,979, discloses that the tank 21 is adapted for the reception of a liquid solution through which pretzel forms or the like are conducted, this being as a preliminary to feeding the pretzels to a baking oven in a manner to be described.

The prior art also discloses that suitable means may be employed to heat the liquid solution in a tank. However, since such heating means forms no part of this invention, no illustration thereof appears. Suitable means may be employed to maintain a desired or required liquid level in the tank 21, reference in this regard being had to my patent, herein referred to.

As illustrated in Figure 1, the pretzels or the like, upon being discharged from the cooking apparatus, are furnished to a conveyor embodying, among other things, a woven wire reticulated endless belt 190 and this belt conducts the food forms, of whatever nature the same happen to be, to an oven 16.

In addition to constituting a means by which the food forms are conducted from the cooking mechanism to the oven 16, the belt 190 forms a part of the coating mechanism by which the food forms are coated with salt or the like.

In describing the salting mechanism in detail, it is pointed out that the same embodies a pair of spaced parallel side arms 160 having the rear portions thereof provided with laterally projecting aligned bearings or bosses 162 and these bosses are rotatably extended through the apertured ears of brackets 164. Merely for the purpose of convenience the brackets are shown to be secured to one end of the frame 20 although it is clear that since the salting mechanism is separate and independent of the material treating or cooking apparatus such mechanism may be mounted on a separate support.

The aligned bearings 162 have a drive shaft 166 extended therethrough and such drive shaft is operatively connected to the main drive shaft 30 through the intervention of a motion transmitting mechanism, such, for example, as an endless sprocket chain 170 and cooperating sprocket wheels.

It is clearly shown in Figures 3 and 4 that a roller 174 is mounted upon the shaft 166 and that at the ends of such roller there are located sprocket wheels 176, the sprocket wheels being welded or otherwise rigidly secured to the ends of the roller for rotation therewith. Of course, the members 174 and 176 are keyed or otherwise rigidly secured to the shaft 166 for rotation therewith.

It is shown in Figures 3 and 4 that the side arms 160 are made up of adjustably connected sections provided with means by which the effective length of the arms may be varied. The outer portion of the arms 160 are joined by a transversely extending small diameter bar 180 having the terminal portions thereof reduced diametrically to form shoulders against which collars 182 bear. More specifically, the collars 182 are confined between washers 186 and the shoulders formed on the end portions of the bar and the collars are provided with annular ribs about which the rollers of the driving chains 188 ride.

The collars 182 and the adjacent washers 186 are of tool steel suitably hardened to resist wear and by reference to Figure 5, it will be seen that the annular ribs about the collars engage the transverse rollers of the roller chains 188 and thereby space the longitudinal links of the chains from contact with the collars with the result that excessive wear is avoided.

The drive chains 188 are trained about the sprocket wheels 176 and are connected to the woven wire conveyor body 190 through the intervention of attaching stems 192 of steel wire or other material found suitable for the purpose. More specifically, the attaching stems 192 have straight shanks threaded into the more or less helical interlocked transverse sections of the conveyor body 190 and although the attaching stems are short as compared to the width of the conveyor, the same nevertheless have effective driving engagement with the conveyor body for causing the same to travel smoothly.

The outer portions of the stems 192 are provided with loops loosely and movably extended through apertured ears carried by uniformly spaced links of the roller chains 188 and this connection between the parts allows the woven wire conveyor belt 190 to turn easily about the small diameter shaft 180. The smaller diameter of the shaft 180 and the fact that the conveyor body 190 is allowed to turn closely about the same decreases the diameter of the outlet end portion of the conveyor 190 so that the pretzels may pass easily from this conveyor onto the oven hearth 200 located immediately below.

By reference to Figures 1, 3, and 4 it will be seen that the outer terminal portions of the arms 160 have connection with the intermediate portions of levers 202, through the aid of the bar 180. The inner portions of the levers 202 have arcuate slots receiving fastening devices 204 so that the positions of the levers 202 with respect to the arms 160 may be varied within the limits allowed by the arcuate slots.

The rollers 206 carried by the levers 202 are adapted to ride on the edge portions of the oven hearth and since the levers 202 are adjustably connected to the arms 160, the position of the conveyor of the salting mechanism with respect to the oven hearth may be varied. That is to say, the conveyor of the salting mechanism may be raised or lowered slightly with respect to the oven hearth for the proper transfer of the pretzel forms from the salting mechanism to the oven hearth, this being illustrated in Figure 1.

Referring now to the particular means by which the pretzel forms are provided on opposite surfaces thereof with a coating of salt, attention is invited to Figure 1 in which it is illustrated that a feeding unit in the nature of a hopper 240 is located immediately above the conveyor 190 and is provided with a downwardly and angularly extending outlet member 242. The outlet member 242 is shown to be decreased in cross sectional area toward the lower open end thereof to define a nozzle or jet by which the salt is discharged onto the pretzels as they pass below.

Of course, the outlet member 242 extends entirely across the conveyor body 190 to furnish a uniform coating of salt to all the pretzels passing below. A portion of the salt from the outlet member 242 will pass through the pretzel forms and through the reticulated conveyor belt below and will contact a deflector or rebound member 244 in the form of a plate extending entirely across the conveyor body and joined at its ends to the side arms 160. It will be seen that the outlet member 242 extends at an acute angle to the plane of the deflector 244 with the result that the salt upon contacting the deflector is directed upward in flight for engagement with the under surfaces of the pretzel forms where it adheres. That is to say, the top surface of the deflector or rebound member 244 and the angle of this surface with respect to the line of descent of the salt in flight constitutes a means by which the salt striking such top surface is deflected in flight up through the conveyor and into speckling contact with the under surfaces of the pretzels or the like.

It has been found that, although the screen conveyor 190 comes between the outlet 242 and the deflector 244 there is sufficient return movement of salt in flight through the screen conveyor to provide for the desired coating or speckling of the under surfaces of the pretzels. By coating the under surfaces of the pretzels as a preliminary to feeding the pretzels to the oven hearth, the pretzels are improved in taste, rendered more salable, and at the same time the salt applied to the under surfaces of the pretzels acts to space the pretzels from the heated plates of the hearth so that scorching of the pretzels is avoided.

The surplus salt which passes through the upper flight of the conveyor is dropped down through the lower flight of the conveyor and is dragged back along the return plate 250 into the collector 252. In this manner, surplus salt is prevented from entering the oven hearth and thus, periodic cleansing of the oven as a result of excess accumulations of loose salt therein is rendered unnecessary. The edge portions of the return plate 250 are welded or otherwise secured to the side arms 160.

Also, the return plate 250 is provided at one terminal portion thereof with an upwardly curved lip underlying and extending slightly beyond the discharge end of the conveyor to pick up the loose salt that is dropped from the conveyor at the discharge end thereof. Of course, the salt that is picked up by the plate 250 is dragged along this plate toward the discharge end thereof and is dropped into the receiver 252.

It is shown in Figure 1 that a plate 251 is located between the deflector 244 and the cross bar 180 and immediately below the upper flight of the conveyor so as to serve as a supporting and guiding means for this flight, holding the same against rippling and sagging. This plate 251 is rigidly joined at its longitudinal edges to the outer sections of the arms 160 and has what might be said to be the inner end thereof spaced a sufficient distance from the deflector 244 to define an intervening transversely extending passage for the descent of salt onto the plate 250 below.

In further adverting to the conveyor 190 and its component parts, such as the plates 250 and 251 and the arms 160, it is pointed out that the same may be straight, as shown, or curved longitudinally to adapt the conveyor to the particular conditions encountered. For example, it may be necessary to place the salting mechanism at a level lower than that of the entrance opening of the hearth in which case, the conveyor of the salting mechanism is curved about the feeding end of the oven hearth conveyor.

Should it be desired to furnish salt only to the upper surfaces and sides of the pretzels, the outlet member 242 may be reversed and caused to occupy the dotted line position shown in Figure 1, wherein the outlet member discharges the salt at a point beyond the deflector 244 so that there is no deflection of the salt into contact with the lower surfaces of the pretzel forms. The outlet member 242 is detachably secured at the upper portion thereof by suitably spaced fastening bolts or other means to the lower portion of the hopper 240 and such means provides for the easy reversal of the outlet member.

In carrying out the invention a suitable feeding wheel or roller 260 is extended across the lower portion of the hopper 240 and provides for the uniform and evenly distributed discharge of salt from the outlet member 242.

Figure 1 illustrates a separate salting device located at the point of transfer of the pretzels from the screen conveyor 190 to the oven hearth 200 and such salting device embodies a hopper 280 having a vertical depending transversely extending outlet member 282 uniformly diminished in width toward the lower end thereof so that the salt is discharged in a rather thin layer extending entirely across the oven hearth. It will be seen that at the moment of transfer of the pretzel forms from the conveyor 190 to the moving hearth 200 the pretzels are inclined allowing a portion of the salt from the outlet member 282 to pass through the pretzel forms onto the hearth immediately below and the salt thus deposited on the hearth will contact the lower surfaces of the pretzel forms and at the same time serve to space the pretzel forms from contact with the moving hearth to the end that scorching of the pretzels is avoided. More specifically, the outlet mouth of the member 282 is shown to be located immediately beyond the discharge end of the conveyor 190 so as to furnish salt to the pretzel forms at the moment of transfer of the pretzel forms from the conveyor 190 to the oven hearth and while the pretzel forms are in the inclined position disclosed in Figure 1.

Of course, when salt is furnished to the pretzels by way of the hopper 280, a portion of the excess salt will accumulate in the oven requiring periodic removal of such accumulation. The discharge of salt from the hopper 280 may be regulated with the aid of a rotary longitudinally ribbed roller 290 or any other means found expedient. It is believed to be clear that the feed rollers 260 and 290 are driven by any suitable source of power.

Having thus described the invention, what is claimed is:

1. In a mechanism of the class described, a reticulated conveyor having upper and lower flights, means to furnish articles of food to the upper flight of the conveyor, a hopper for granular material located above the conveyor and having an outlet member, and a rebound member between the upper and lower flights of the conveyor and in the path of travel of the granular material discharged from said outlet member to bounce the granular material engaged thereby into speckling contact with the food, said outlet member being extended at an acute angle to the plane of the deflector.

2. In a mechanism of the class described, a reticulated conveyor having upper and lower flights, means to furnish articles of food to the upper flight of the conveyor, a hopper for granular material located above the conveyor and having an outlet member, a rebound member in the path of travel of the granular material discharged from said outlet member to bounce a portion of the granular material through the conveyor and into contact with the under surfaces of the articles of food, said outlet member being extended at an acute angle to the plane of the deflector, and an imperforate plate beneath the lower flight of the conveyor, in supporting relation thereto.

3. In a salting mechanism for pretzel forms, a reticulated conveyor, a hopper above the conveyor and adapted for the reception of salt and having an outlet member provided with an outlet end to discharge salt onto pretzel forms carried by the conveyor, and a rebound member embodying a plate disposed immediately below a portion of said conveyor in the path of travel of the salt discharged from said outlet member, there being means cooperating with the conveyor to conduct surplus salt to a predetermined point and embodying a plate supporting the conveyor.

4. In a salting mechanism for pretzel forms, a conveyor having means whereby the same may be located above and in overlapping relation to an oven hearth to furnish pretzels thereto and causing the pretzels to assume inclined positions at the moment of transfer to the oven hearth, and a salting mechanism having means to furnish salt to the pretzels at the moment of transfer of the pretzels from the conveyor to the hearth and while the pretzels are in the said inclined position to allow a portion of the salt to pass through the pretzels onto the hearth below to space the pretzels from the hearth.

5. In a mechanism of the character specified, a conveyor having means for conducting pretzels, a second conveyor immediately below the first named conveyor to receive pretzels therefrom, and a salting mechanism located immediately beyond the first named conveyor and having means to furnish salt to the pretzels at the moment of descent of the pretzels from the first conveyor to the second named conveyor whereby a portion of the salt is allowed to drop through the pretzels onto the second named conveyor below to cause the salt thus dropped through the pretzels to support the pretzels in spaced relation to the second named conveyor.

6. In a salting mechanism for pretzel forms, a reticulated endless conveyor having upper and lower flights, a hopper above the upper flight and adapted for the reception of salt and being provided with an outlet member to discharge salt onto pretzel forms carried by the conveyor, plates immediately below the upper flight of the conveyor in supporting and guiding relation thereto, and a plate beneath the lower flight of the conveyor in supporting and guiding relation thereto and in receptive relation to the salt which passes through the upper flight of the conveyor, said lower flight of the conveyor being movable on the last named plate in contact therewith to move salt on the last named plate toward one end of the last named plate.

7. In a mechanism for speckling the upper and lower surfaces of food forms with a granular material, a conveyor for food forms and having reticulations for the free passage of grains of material, a feeding unit for the granular material having an outlet above the conveyor in feeding relation to the upper surfaces of the food forms on the conveyor to furnish granular material in flight thereto, a plate immediately below a portion of the conveyor in supporting relation thereto and having a top surface in the line of flight of granular material to rebound the material up through the conveyor and into speckling contact with the lower surfaces of the food forms.

8. In a mechanism for coating food forms on the upper and lower surfaces thereof with a granular material, a conveyor for supporting food forms and having reticulations for the free passage of the grains in flight, a hopper for the granular material above the conveyor and having an outlet in feeding relation to the food forms on the conveyor, and a rebound member below a portion of said conveyor in supporting contact therewith and disposed directly in the path of granular material descending in flight from the hopper and passing through the reticulations of the conveyor, said rebound member deflecting the flight of the grains of material upward through said reticulations into speckling contact with the under surfaces of the food forms.

9. In a mechanism for speckling food forms with granular material, a conveyor having a run for food and having reticulations for the free passage of granular material, a feeding unit for granular material and having an outlet at one side of said run and in feeding relation to one side of said food, and a rebound member at the other side of said run and having one surface thereof in the path of said granular material for forceful engagement by the granular material to bounce such material into speckling contact with the other side of said food.

10. In a mechanism for speckling food forms with granular material, a conveyor having a run for food and having reticulations for the free passage of granular material, a feeding unit for granular material and having an outlet at one side of said run and in feeding relation to one side of said food, a rebound member at the other side of said run and having one surface thereof in the path of said granular material for forceful engagement by the granular material to bounce such material into speckling contact with the other side of said food, and a plate underlying the conveyor in supporting relation thereto and adapted to intercept the surplus granular material.

11. In a mechanism for speckling food forms with granular material, a conveyor having a run for food and having reticulations for the free passage of granular material, a feeding unit for granular material and having an outlet at one side of said run and in feeding relation to one side of said food, a rebound member at the other side of said run and having one surface thereof in the path of said granular material for forceful engagement by the granular material to bounce such material into speckling contact with the other side of said food, and a plate underlying the conveyor in supporting relation thereto and adapted to intercept the surplus granular material, said plate having a curved lip extending beyond one end of the conveyor.

12. In a mechanism for speckling food forms with granular material, a conveyor having a run for food and having reticulations for the free passage of granular material, a feeding unit for granular material and having an outlet at one side of said run and in feeding relation to one side of said food, a rebound member at the other side of said run and having one surface thereof in the path of said granular material for forceful engagement by the granular material to bounce such material into speckling contact with the other side of said food, and a plate underlying the conveyor in supporting relation thereto and arranged to intercept and guide the surplus granular material, said conveyor being movable along said plate in contact therewith so as to drag along the granular material encountered on the plate.

13. In a mechanism for speckling food forms with granular material, a conveyor having a run for food and reticulations for the passage of granular material, a feeding unit for granular material and having an outlet at one side of the said run in feeding relation to one side of the food upon said conveyor, a rebound member at the other side of said run and having one surface thereof in the range and path of said granular material for forceful engagement by the granular material to bounce such material into speckling contact with the other side of said food, and a plate underlying the conveyor in supporting relation thereto and projecting beyond the said rebound member to intercept the surplus granular material.

14. In a salting mechanism for pretzel forms, a reticulated endless conveyor having upper and lower flights, a hopper above the upper flight and adapted for the reception of salt and being provided with an outlet to discharge salt onto pretzel forms carried by the conveyor, and a plate beneath the lower flight of the conveyor in supporting and guiding relation thereto and adapted to receive the surplus salt, said lower flight of the conveyor being movable on said plate in contact therewith to move salt on the plate toward one end thereof.

JOSEPH D. FERRY.